March 10, 1931.  M. J. ROBERTSON  1,795,508
BRAKE
Filed May 4, 1928   3 Sheets-Sheet 1

MARTIN J. ROBERTSON
Inventor
By C. A. Snow & Co.
Attorneys.

March 10, 1931.  M. J. ROBERTSON  1,795,508
BRAKE
Filed May 4, 1928   3 Sheets-Sheet 2

MARTIN J. ROBERTSON
Inventor
By C. A. Snow & Co.
Attorneys

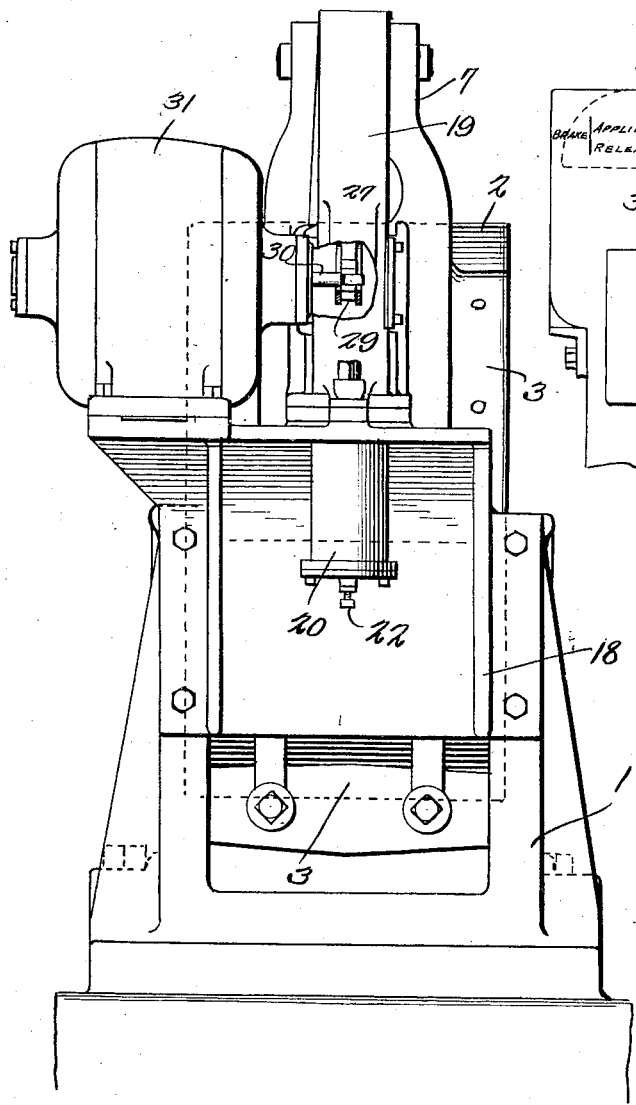
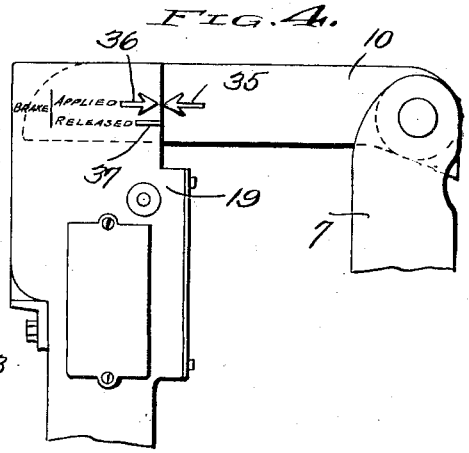
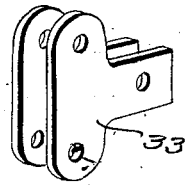

Patented Mar. 10, 1931

1,795,508

UNITED STATES PATENT OFFICE

MARTIN J. ROBERTSON, OF LOUISVILLE, KENTUCKY

BRAKE

Application filed May 4, 1928. Serial No. 275,242.

This invention relates to a brake designed primarily for use in connection with elevators.

It has been the practice heretofore to equip electric elevators with brakes actuated by electro-magnets. These, however, have met with more or less difficulties and objections. For example the operation of solenoid or other electro-magnets in connection with brakes, where an alternating current is used, has generally produced a chattering or humming vibratory noise as well as noises resulting from the violent impact of the solenoids or electro-magnet cores with surfaces in the paths thereof, these coming together at the time the brake is released. A further objection resides in the fact that brakes operated by electro-magnets usually produce a sudden application of the braking pressure at the instant that the electro-magnets are de-energized, this action resulting in a violent impact of the brake shoe members against the brake wheel.

The present invention has been designed to avoid the objections enumerated by utilizing a motor operated brake which is practically noiseless when used with either alternating or direct current, all humming and pounding noises being eliminated while, due to the flexibility of construction and the fact that there are no suddenly applied forces, a smooth release and application of the brake is effected.

A further object is to provide a mechanism of this character which can be adjusted readily to meet changes in working conditions.

A still further object is to provide the mechanism with an indicating means whereby it can be determined readily whether or not the brake members are properly positioned for most efficient operation.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 3 is a side elevation, a part of the housing being broken away.

Figure 4 is a front elevation of the housing, on a reduced scale, showing the indicating mechanism.

Figure 5 is a perspective view of one form of coupling that can be used with the operating chain of the mechanism.

Figure 1:
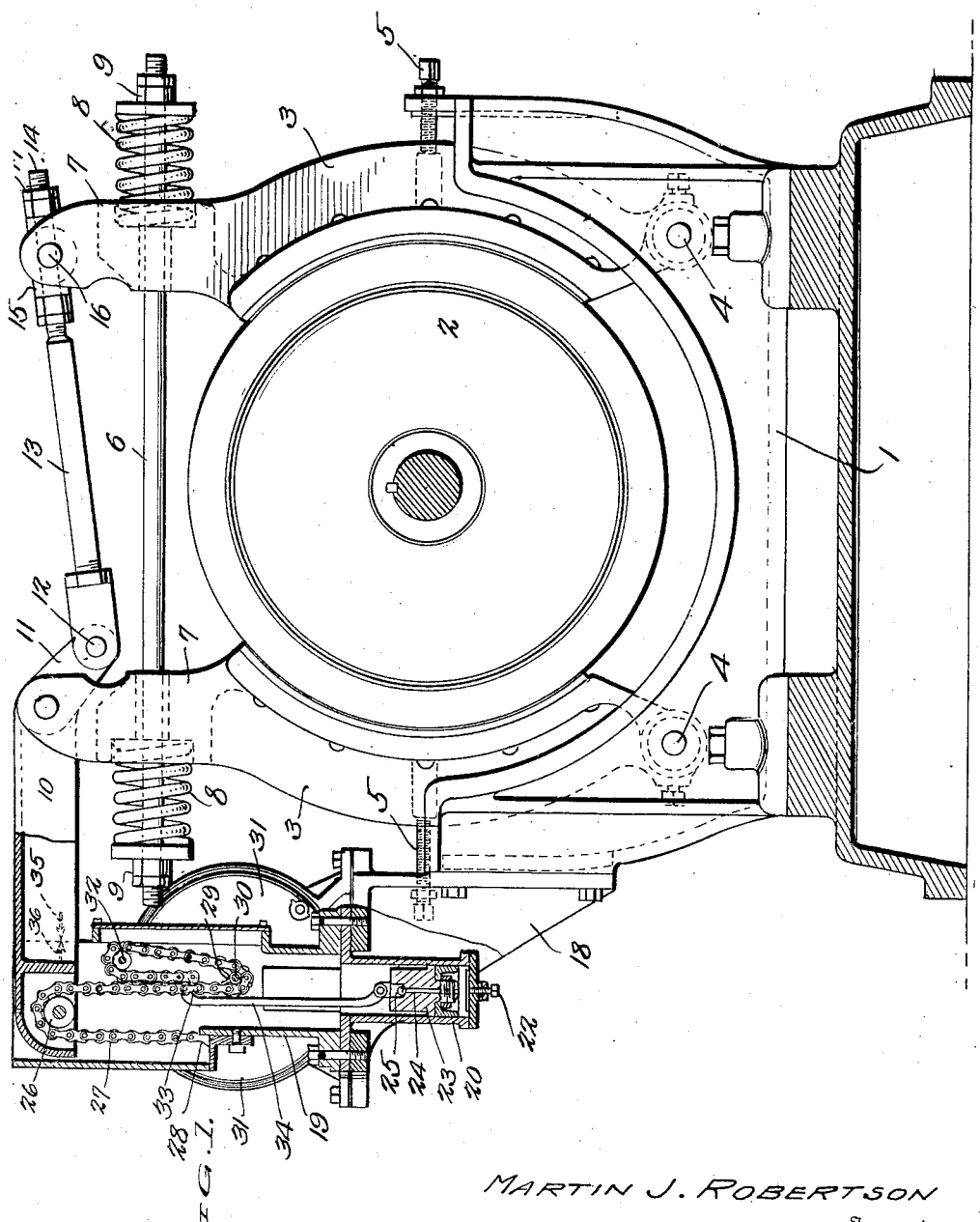
Figure 1 is a view partly in section and partly in elevation of a brake mechanism such as constitutes the present invention.

Referring to the figures by characters of reference 1 designates the base of the brake mechanism above which is journaled the brake wheel 2. Opposed brake shoes 3 are pivotally connected to the base 1 as indicated at 4, the movement thereof away from the brake wheel 2 being limited by adjustable stops 5 in the form of screws. A connecting rod 6 is extended loosely through arms 7 projecting from the shoes 3 and mounted on the end portions of this rod are springs 8 which bear against the arms 7. The springs can be placed under any desired normal compression by means of nuts 9 adjustable on the ends of the rod 6. Thus it will be seen that the springs operate to hold the brake shoes normally pressed against the periphery of the brake wheel 2.

Pivotally connected to one of the arms 7 is a bell crank 10 having a short arm 11 pivotally connected at 12 to one end of a rod 13. The other end of this rod is screw threaded as shown at 14 and adjustably mounted within a sleeve 15 which is pivotally mounted at 16 in the adjacent arm 7. Nuts 17 mounted on the threaded portion of the rod at opposite ends of the sleeve 15 serve to hold said rod against longitudinal movement relative to the sleeve after an adjustment has been effected. It will be apparent that rod 13 and the short arm 11 of the bell crank cooperate to form a toggle connection between the two arms 7 so that when the bell crank 10 is swung in one direction this toggle connection will act to shift the brake shoes away from each other against the action of the springs 8 whereas, when the movement of the bell crank is reversed, the springs 8 will thrust the brake shoes toward each other and cause them to bind tightly against the wheel 2.

A bracket 18 is mounted on the base 1 and supports a housing 19 from which depends a dash pot 20 which opens into the housing. The lower end of the dash pot has a vent 21 provided with a controlling valve in the form of a screw 22. A piston 23 is slidably mounted in the dash pot and has a passage 24 extending therethrough provided, at its upper end, with a check valve 25 preferably in the form of a ball.

The free end portion of the long arm of bell crank 10 extends into the open top of the housing 19 and journaled within this end portion of the bell crank is a pulley 26 on which is mounted a chain 27. One end portion of this chain extends downwardly and is anchored to a bracket 28 secured in the housing 19. The other end portion of the chain is extended downwardly under and in engagement with a sprocket 29 secured to the shaft 30 of a torque motor 31 mounted on the bracket 18. From this sprocket 29 the chain is extended upwardly over a pulley 32 journaled in the housing and thence downwardly to a coupling member 33 which is carried by the adjacent downwardly extending portion of the chain 27. Thus this chain is anchored at one end, as shown at 28 while its other end portion is formed into an endless elongated loop extending around and in engagement with pulley 32 and sprocket 29. A link 34 connects the chain 27 to the piston 23.

Figure 2:
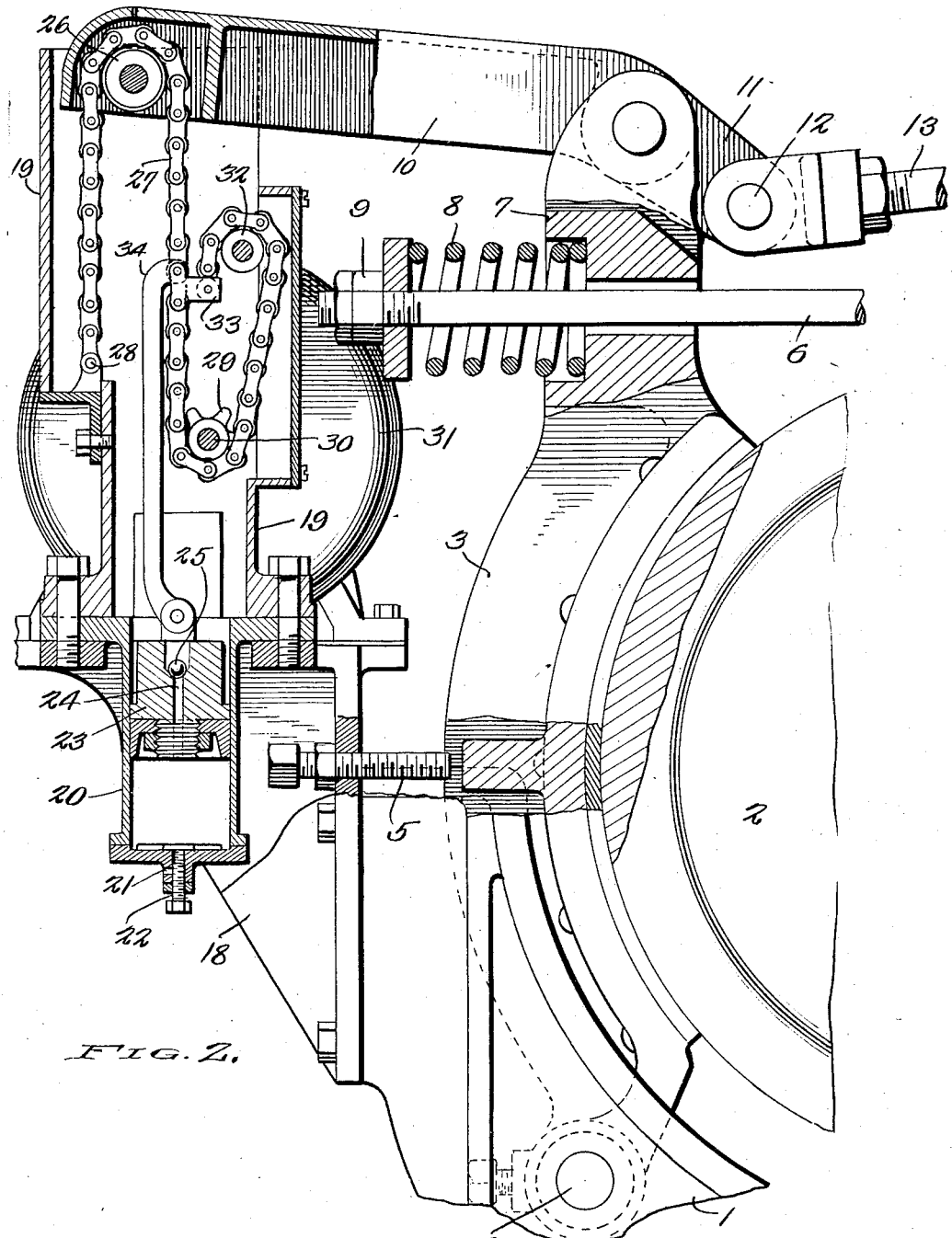
Figure 2 is an enlarged section through the housing containing the operating mechanism of the brake, adjacent parts being shown partly in elevation and partly in section.

Under normal conditions the brake shoes are applied as shown in Figure 2 the piston 23 being located at the upper end of the dash pot 20. When it is desired to release the brake, current is directed by any suitable means to the motor 31 which will cause the sprocket 29 to rotate in a counterclockwise direction. Consequently that portion of the chain 27 at the left of the sprocket in Figure 2 will be pulled downwardly by the sprocket and pull on the end of bell crank 10 with the result that the toggle connection between the arms 7 will be actuated to spread apart the brake shoes and release the wheel 2. By looping the chain as described it will have a compounding action whereby relatively low torque in the motor will be multiplied to produce a high brake power from a small torque motor.

During the foregoing operation link 34 will be thrust downwardly and cause the piston 23 to move to the position shown in Figure 1 at which time the brake wheel is released as shown in said figure. At the time piston 23 reaches the limit of its downward movement the torque motor 31 has been stalled. When it is desired to apply the brake the current to the motor 31 is shut off and springs 8 are immediately brought into play. These springs will thrust the brake shoes toward each other and cause the bell crank 10 to move from the position shown in Figure 1 to the position shown in Figure 2. Ordinarily this action, accelerated by the inertia of the moving mass of the armature of the motor 31, which is driven in a clockwise direction by the action of the chain on the sprocket 29, would produce an abrupt application of the brake shoes to the wheel 2 and would tend to carry the connection 33 upwardly against the pulley 32. For the purpose of retarding this action and effecting a gradual smooth application of the brake, the dash pot has been provided. During the movement of the brake shoes under the action of the springs 8 following the deenergizing of the motor, the piston 23 will be pulled upwardly by the link 34 and as the check valve 25 will close during this action, this piston will act as a retarding means so that the return of the parts to their normal positions will be gradual. The speed of this return will of course be controlled by the position of the valve 22 relative to the vent 21.

In order that the operator may determine readily the extent of movement of the brake shoes while being applied and released, an indicator, illustrated in detail in Figure 4, has been provided. This includes an index in the form of an arrow-head 35 or the like carried by the long arm of the bell crank 10 and movable adjacent to the housing 19. On this housing are arranged indexes 36 and 37 one of which can be designated by the word "Applied" while the other can be indicated by the word "Released." These indicating means are so located that when the brake is properly adjusted and the shoes are applied to the brake wheel, the indexes 35 and 36 will register and, when the brake shoes are brought to proper positions on being released from the wheel, the indexes 35 and 37 will register. If, however, the brake shoes should become worn to an objectionable extent or some of the working parts should require adjustment, that fact will be indicated clearly because, under these conditions, the index 35 would not properly register with the indexes 36 and 37 when the brake shoes are brought to their two extreme positions.

What is claimed is:

1. A brake including a wheel, a brake shoe, yielding means for holding the shoe normally applied, an electric torque motor, and flexible torque multiplying means having a portion held against movement, the remainder of said means being actuated by the motor for shifting the brake shoe from the wheel and stalling the motor, said means being operatively coupled to the motor at all times.

2. A brake including a wheel, a shoe for engagement therewith, an electric torque motor, flexible torque multiplying means there being a portion held against movement, the remainder of said means being actuated by the motor for shifting the shoe out of engagement with the wheel and stalling the motor while energized, yielding means for applying the shoe to the wheel when the motor is de-energized, and means connected to and actuated by a movable portion of said flexible means for retarding the application of the shoe to the wheel.

3. The combination with a brake wheel and a brake member for application thereto, of a torque motor, flexible torque multiplying means having a portion held against movement, the remainder of said means being actuated by the motor for shifting the brake member from engagement with the wheel, resilient means for automatically applying the brake member to the wheel when the motor is de-energized, and cooperating with the first named flexible means for rotating the motor back toward its initial position.

4. The combination with a brake wheel and a brake member for application thereto, of a torque motor, looped flexible torque multiplying means having a portion held against movement, the remainder of said means being actuated by the motor for shifting the brake member from engagement with the wheel, resilient means for automatically applying the brake member to the wheel when the motor is de-energized, and cooperating with the first named means for rotating the motor back toward its initial position, and means connected to a movable portion of the looped flexible means for retarding said rotation of the motor after the application of the brake member to the wheel.

5. The combination with a brake wheel and a brake member cooperating therewith, of a torque motor, looped flexible torque multiplying means having a portion held against movement, the remainder of said means being actuated by the motor when energized for shifting the brake member out of contact with the wheel, resilient means for automatically applying said brake member to the wheel and actuating the motor in a reversed direction when said motor is de-energized, and a dash pot mechanism connected to a movable portion of said looped flexible means for retarding said movement of the motor and the application of the brake member.

6. The combination with a brake wheel and a brake member cooperating therewith, of resilient means for holding the brake member normally applied to the wheel, a torque motor, looped flexible torque multiplying means having a portion held against movement, the remainder of said means being actuated by the motor for shifting the brake member against the action of said resilient means to release the wheel and stall the motor, both of said means cooperating to reverse the rotation of the motor and apply the brake member to the wheel when the motor is de-energized, and means connected to a movable portion of said looped flexible means for retarding the reverse rotation of the motor and the application of the brake member.

7. The combination with a brake wheel and a member for application thereto, of a torque motor, a flexible element anchored at one end and having a closed loop at its other end, a sprocket within the closed loop and actuated by the motor for shifting said flexible element, supporting and guiding means for the closed loop of the flexible element, means actuated by said flexible element when the motor is energized and rotating in one direction for shifting the brake member out of contact with the wheel and stalling the motor, and resilient means for returning the brake member into contact with the wheel and shifting the flexible element to reverse the rotation of the motor when said motor is de-energized.

8. The combination with a brake wheel and a member for application thereto, of a torque motor, a flexible element anchored at one end and having a closed loop at its other end, a sprocket within the closed loop and actuated by the motor for shifting said flexible element, supporting and guiding means for the closed loop of the flexible element, means actuated by said flexible element when the motor is energized and rotating in one direction for shifting the brake member out of contact with the wheel and stalling the motor, resilient means for returning the brake member into contact with the wheel and shifting the flexible element to reverse the rotation of the motor when said motor is de-energized, and means for retarding the operation of said flexible element, the motor and the brake member under the action of the resilient means.

9. The combination with a brake wheel and a member for application thereto, of a torque motor, a flexible element anchored at one end and having a closed loop at its other end, a sprocket within the closed loop and actuated by the motor for shifting said flexible element, supporting and guiding means for the closed loop of the flexible element, means actuated by said flexible element when the motor is energized and rotating in one direction for shifting the brake member out of contact with the wheel and stalling the motor, resilient means for returning the brake member into contact with the wheel and shifting the flexible element to reverse the rotation of the motor when said motor is de-energized, and means for retarding the operation of said flexible element, the motor and the brake member under the action of the resilient means, said means including a dash pot, a valved piston mounted for reciprocation therein, and an operative connection between the piston and the flexible element.

10. The combination with a brake wheel and opposed members for application thereto, of a toggle connection between the members including a bell crank, a flexible element anchored at one end and movably connected to and adapted to actuate the bell crank, there being a closed loop at the other end of said element, a supporting member for the loop, a torque motor, means driven thereby and engaging the closed loop for actuating said element during the rotation of the motor in one direction, thereby to shift the toggle connection and disengage the brake members from the wheels, means exerting a constant pressure against the brake members for automatically applying said members to the wheel when the motor is de-energized, thereby to transmit motion through the toggle connection and the flexible element to the motor to reverse the rotation of the motor, and means for retarding the action of the brake members and the motor when said motor is de-energized.

11. The combination with a brake wheel and opposed members for application thereto, of a toggle connection between the members including a bell crank, a flexible element anchored at one end and movably connected to and adapted to actuate the bell crank, there being a closed loop at the other end of said element, a supporting member for the loop, a torque motor, means driven thereby and engaging the closed loop for actuating said element during the rotation of the motor in one direction, thereby to shift the toggle connection and disengage the brake members from the wheels, means exerting a constant pressure against the brake members for automatically applying said members to the wheel when the motor is de-energized, thereby to transmit motion through the toggle connection and the flexible element to the motor to reverse the rotation of the motor, and means for retarding the action of the brake members and the motor when said motor is de-energized, said means including a dash pot, a valved piston mounted for reciprocation therein, and an operative connection between the piston and the flexible element.

12. The combination with a brake wheel and brake members for application thereto, of adjustable resilient means for holding the brake members normally applied to the wheel, an adjustable toggle connection between the members including a bell crank, a torque motor, means actuated by the torque motor for shifting the bell crank to move the brake members away from the wheel and place the resilient means under increased compression, all of said means operating to stall the motor when the brake members are in released position and to reverse the action of the motor and apply the brake members to the wheel when the motor is de-energized, and relatively fixed and movable means for indicating the extent of movement of the bell crank and brake members between extreme positions.

In testimony that I claim the foregoing as my own, I have hereto affixed my signature.

MARTIN J. ROBERTSON.